April 6, 1943.  J. W. PACKIE  2,316,016
REMOVAL OF ENTRAINED PARTICLES FROM VAPOR
Filed Oct. 23, 1940
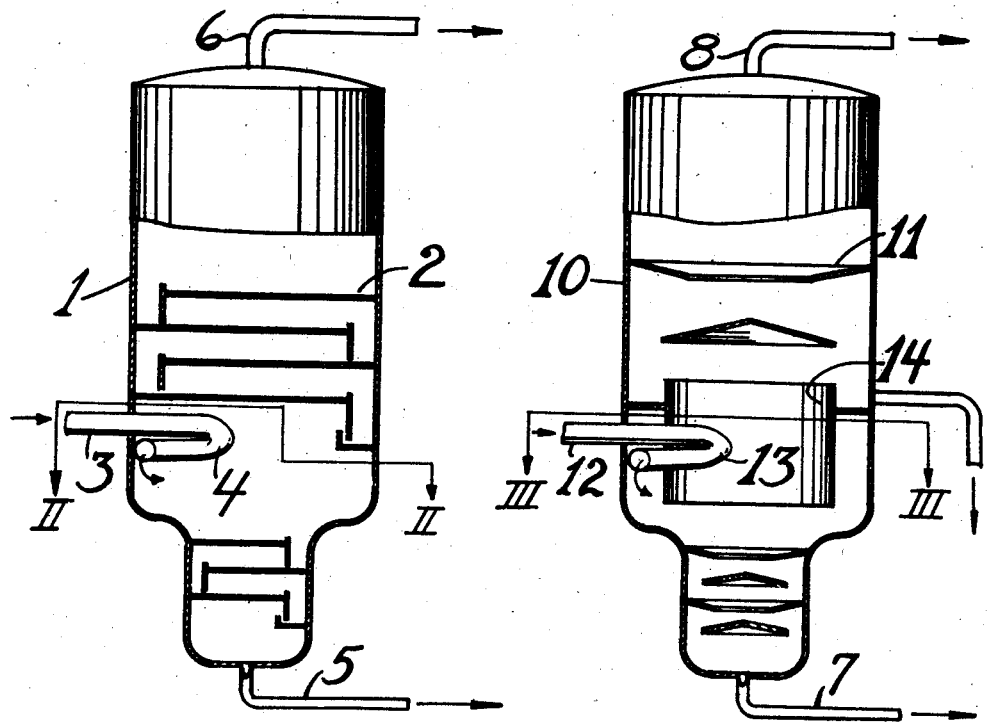
Fig.-1
Fig.-2
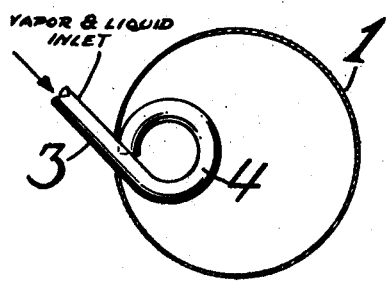
Fig.-3
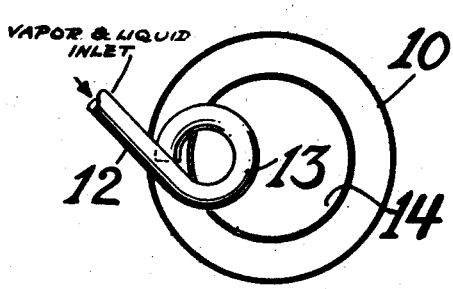
Fig.-4
John W. Packie Inventor
By [signature] Attorney Patented Apr. 6, 1943

2,316,016

UNITED STATES PATENT OFFICE 2,316,016

REMOVAL OF ENTRAINED PARTICLES FROM VAPORS

John W. Packie, Green Village, N. J., assignor to Standard Oil Development Company, a corporation of Delaware Application October 23, 1940, Serial No. 362,407

2 Claims. (Cl. 183—75)

The present invention is concerned with the separation or removal of entrained particles from gases or vapors containing the same. The invention is more particularly concerned with the removal of entrained liquid particles from vapors secured in the refining of petroleum oils, in which it is desired to separate the liquid particles completely from the vaporous constituents in a separation zone. In accordance with the present invention, substantially complete separation of the liquid phase from the vapor phase is secured by utilizing an improved entrainment separator at the point of introduction of the feed mixture into a separation zone. The improved entrainment separator comprises a substantially horizontal loop attached directly to the intake conduit which discharges tangentially to the shell of the separator, preferably below the point at which the feed mixture is introduced into the separation zone.

In various operations, as for example in the refining of petroleum oils, it is necessary to remove minute liquid particles which are entrained in the gaseous or vaporous mixture prior to processing these mixtures in a distillation or related operation in order to secure an efficient and economical process. Various methods have been suggested in order to attain this result. For example, it is known to introduce the feed mixture comprising vaporous mixtures containing small particles of liquid constituents into relatively large chambers and allow the liquid constituents to settle out. This is not entirely desirable since relatively large separation zones are required. Another method is to use various baffle means and to reverse the flow of fluid in order to remove undesirable liquid constituents. It has also been suggested, particularly in the refining of petroleum oils, that the feed mixtures containing the entrained undesirable particles be introduced into drum-like separation chambers, in a manner that the mixture is introduced in a circuitous manner tangential to the cylindrical shell of the chamber. These arrangements, while satisfactory in many operations, do not completely remove the entrained particles, particularly if the velocity of the incoming feed is relatively high, and when the size of the entrained liquid particles is relatively small.

I have now discovered an entrainment separator which is particularly effective in the removal of liquid constituents from vaporous mixtures containing the same. My entrainment separator is especially adapted for use in separation zones cylindrical in character and comprises extending the feed conduit into the separation zone and forming an internal essentially horizontal loop which discharges tangentially to the shell, preferably below the point of passage of the conduit through the shell. In accordance with the preferred modification of the invention, a similar cylindrical section is concentrically disposed within the separation drum, thus creating an area for the separation of the liquid particles from the vapors. In accordance with the preferred modification of the invention, the inner concentrically disposed cylindrical shell is open at the bottom so that the vapors must pass downward to escape to the free space in the contour of the shell. This results in uniform distribution of the vapors as they start their passage up the tower.

The entrainment separator of the present invention may be readily understood by reference to the attached drawing illustrating modifications of the same. For purposes of illustration it is assumed that the separator is disposed and constitutes an integral part of the lower section of a separation zone. Figure 1 illustrates a general modification of the separator, while Figure 2 illustrates a preferred modification of the separator employing a cylindrical concentrically disposed section within the separation zone. Figure 3 illustrates a top view of the apparatus disclosed in Figure 1 while Figure 4 illustrates a top view of the apparatus disclosed in Figure 2. Referring specifically to Figure 1, the lower section of a separation zone is designated by numeral 1. Separation zone 1 contains various distributing and separation means 2, which for the purpose of illustration are shown to be bubble cap plates. The feed mixture comprising vaporous and liquid constituents is introduced into the lower section of separation zone 1 at a point below the distributing and contacting means 2 by means of feed conduit 3. The feed mixture flows through the entrainment separator of the present invention which comprises a substantially horizontal loop 4 which discharges tangentially to the shell of separation zone 1. In this manner the velocity of liquid constituents is substantially decreased while flowing through the loop 4 by being thrown out by centrifugal force against the outer wall of the loop. The liquid constituents leave the loop at a low velocity and flow downwardly into the lower section of separation zone 1 and are removed by means of line 5, while the vaprous constituents flow upwardly through the zone and are removed by means of line 6. By this process a substantially complete separation is secured in an efficient manner.

Referring specifically to Figure 2, the shell of the lower section of a separation zone is designated by numeral 10. The separation zone similarly contains adequate separation means 11. The feed material comprising a mixture of vapors and entrained liquid particles, is introduced into separation zone 10 by means of line 12 and passes through entrainment separator 13 which similarly comprises a substantially horizontal loop which discharges tangentially to the shell of separation zone 10. In order to secure a more efficient separation, the entrainment separator also comprises a similar cylindrical section 14 concentrically disposed within the separation zone 10. Thus the feed mixture emerges from the end of the loop 13, flows tangentially around the shell 10 in the area between section 14 and the shell. In this manner substantially complete removal of the entrained liquid particles from the vaporous mixture is secured. In this preferred modification of the present invention the bottom of the inner cylindrical section 14 is left open and the vapors flow downwardly around the lower edge of section 14 and upwardly through the separation zone. Liquid particles are removed as a bottoms by means of line 7 while the vapors free of liquid constituents are removed overhead by means of line 8.

The entrainment separator of the present invention may be widely modified. The separator essentially comprises a loop, preferably a substantially horizontal loop which is an extension of the feed conduit to the separation zone and which discharges tangentially to the inner shell of the separation zone. In accordance with the preferred modification of the process, the discharge is preferably below the point at which the feed conduit enters the shell. Although the design of the present entrainment separator may be modified, depending upon the type of separation zone employed, and the particular feed mixture, as well as upon the respective diameters of the feed conduit and the diameter of the cylindrical separator, in general it is preferred that the radius of the separator loop be less than half the radius of the cylindrical separation zone. In a similar manner the radius of the inner concentrically disposed section may be varied considerably, depending upon the above-named factors. However, in general it is preferred that the diameter of the inner concentrically disposed section be in the range from about 50% to 75% of the diameter of the separation zone. The height of the section should be sufficient to prevent the vapors from short circuiting from the outlet of the loop directly up the tower at high velocity. In general it is preferred that the section extend downwardly from the point at which the feed conduit enters the separation zone, at least an amount equivalent to ⅓ the diameter of the separation zone.

What I claim as new and wish to protect by Letters Patent is:

1. Separation zone comprising a cylindrical drum, feed means for introducing a feed mixture into said drum, one substantially horizontal loop comprising an extension of said feed means the discharge end of which is substantially tangent to the inner cylindrical wall of the separation drum, said horizontal loop being characterized by having a diameter appreciably less than the diameter of said cylindrical drum, said separation drum also containing disposed therein an inner concentrically disposed cylindrical shell the upper end of which is adjacent said feed means and loop, said inner concentric disposed cylindrical shell being attached at its upper end to the inner wall of said cylindrical drum by a solid shield in a manner that vapors cannot flow upwardly between the cylindrical drum and the cylindrical shell, means for withdrawing vapors overhead and liquid from the bottom of said separation drum.

2. Separation zone as defined by claim 1 in which the diameter of said loop is less than one half of the diameter of the separation drum.

JOHN W. PACKIE.